UNITED STATES PATENT OFFICE 2,577,201

PREPARATION OF MELAMINE

Leslie C. Lane, Bethel, Conn., assignor to American Cyanamid Company, New York, N. Y., a corporation of Maine No Drawing. Application October 25, 1950, Serial No. 192,150

3 Claims. (Cl. 260—249.7)

The present invention relates to the preparation of melamine.

It is an object of the invention to prepare melamine by reacting hydrogen cyanide and ammonia under heat and pressure.

It has now been found that if hydrogen cyanide and ammonia are heated alone in a high pressure system, melamine is formed. The invention contemplates heating hydrogen cyanide and ammonia at a temperature within the range of 275°–550° C. under a pressure of at least 500 p. s. i. The hydrogen cyanide and ammonia can be present in virtually any proportion, for example, within the mole ratio range of 1–20:1–20 respectively, or even wider. It is preferred that the reactants be introduced into a reaction zone maintained at a temperature not lower than 275° C.

The following example illustrates without limiting the invention.

Example

Into an empty 310-cc. autoclave maintained at a temperature of 350° C. is forced over a period of approximately 50 minutes a solution of 20 g. of hydrogen cyanide in 50 g. of ammonia. The autoclave is then sealed and maintained at 350° C. under the autogenously developed pressure of 4500 p. s. i. for an additional two hours. The autoclave is then quenched, vented, and opened. The reaction mass is digested in boiling water to extract the melamine from the hydrogen cyanide polymer. The liquor is filtered and the filtrate is treated with Darco and again filtered. Melamine is obtained from the second filtrate by reducing the volume of the filtrate over a steam bath followed by cooling to allow the melamine to crystallize.

Although the process gives melamine at any temperature within the range of 275°–550° C., the narrower range 350°–400° C. is preferred.

In one embodiment of the invention, polymerization of the HCN is inhibited by first introducing ammonia into the reactor, bringing the ammonia up to reaction temperature, and then adding the HCN to the hot ammonia. If desired, the ammonia can be preheated before pumping it into the reactor.

While the invention has been described with particular reference to specific embodiments, it is to be understood that it is not to be limited thereto but is to be construed broadly and restricted solely by the scope of the appended claims.

I claim:

1. The method of making melamine that comprises heating only hydrogen cyanide and ammonia at a temperature within the range 275°–550° C. and at a pressure of at least 500 p. s. i.

2. The method according to claim 1 in which the temperature is about 350°–400° C.

3. The method according to claim 1 in which HCN is added to ammonia, the ammonia being at a temperature of at least 275° C. when the HCN is added.

LESLIE C. LANE.

No references cited.